United States Patent Office 3,817,735
Patented June 18, 1974

3,817,735
CARBON ELECTRICAL HEATERS IN FLOAT GLASS APPARATUS AND METHOD OF USING SAME
David Jones, St. Helens, England, assignor to Pilkington Brothers Limited, St. Helens, England
Filed Apr. 19, 1973, Ser. No. 352,665
Claims priority, application Great Britain, Apr. 21, 1972, 18,719/72
Int. Cl. C03b 18/00
U.S. Cl. 65—99 A    17 Claims

ABSTRACT OF THE DISCLOSURE

An electrical heater for use in apparatus for the manufacture of flat glass on a molten metal bath comprises heating elements in the form of bars of carbon material fixed on insulators in an elongated carbon box. Heat is conducted through the box floor to heat flows of molten metal beneath the box when the heater is immersed in the molten metal bath, or the heater may be roof-mounted with the box floor directed towards the molten metal bath.

BACKGROUND OF THE INVENTION

This invention relates to electrical heaters and in particular to an electrical heater construction for use in apparatus for the manufacture of flat glass on a molten metal bath.

Usually such glass manufacturing apparatus, which is used for the manufacture of float glass comprises an elongated tank structure containing a bath of molten metal which is usually molten tin or a molten alloy of tin in which tin predominates. A roof structure bridges the tank structure and defines therewith an inlet at one end of the elongated tank structure through which molten glass is delivered on to the bath surface at a controlled rate, and an outlet at the opposite end of the elongated tank structure through which the eventual ribbon of float glass is discharged on to a conveyor which conveys the ribbon through an annealing lehr.

A protective atmosphere is maintained in the headspace defined by the roof structure over the bath of molten metal contained in the tank structure. This protective atmosphere may be an inert atmosphere, for example an atmosphere of nitrogen, although it is preferred that the atmosphere has slight reducing properties. A preferred atmosphere which is used consists of 95% nitrogen and 5% hydrogen.

At the inlet end of the tank structure the temperature may be of the order of 1,100° C. to 1,000° C. and there is careful regulation of the temperature regime to which the glass ribbon advancing along the bath is subjected as it cools during its advance. The temperature at the outlet end is usually of the order of 650° C., this being a temperature at which a ribbon of soda-lime-silica glass can be lifted from the bath surface for discharge through the outlet on to the conveyor rollers without marring the undersurface of the ribbon. The thermal regulation of the state of the ribbon is subject to accurate control particularly at the hot inlet end of the bath where the molten glass delivered to the bath is maintained for a distance along the bath at a temperature such that unhindered lateral flow can take place to form a buoyant body of molten glass which is thereafter advanced in ribbon form along the bath.

The forces to which the ribbon of glass is subjected during its advance determined the width and thickness dimensions of the eventual ribbon produced and the viscosity of the advancing glass is subject to control throughout its advance. This control of the viscosity is effected by controlling the temperature of the ambience to which the advancing ribbon is subjected. This control is effected usually by means of electrical radiant heaters in the roof structure. Additionally heaters may be provided in the molten metal bath.

The heaters which are employed have to be maintained in continuous operation under arduous high temperature conditions whether in the atmosphere in the headspace over the bath or in the molten metal itself and it is a main object of the present invention to provide an electric heater construction of robust design capable of withstanding the arduous conditions in the environment existing within the float glass manufacturing apparatus, whether designed as a roof heater for radiating downwardly on to the glass or on to the exposed surface of the molten metal bath alongside the glass, or as a heater for immersion in the bath for heating particular localities or flows of the molten metal at specific locations.

SUMMARY

A single-phase or three-phase electrical heater for use in apparatus for the manufacture of flat glass on a molten metal bath has carbon heating elements fixed in insulating supports in an elongated carbon box which is preferably sealed. Electrical connectors extend through and into the box to connect with the heating elements. In a preferred embodiment of the invention the floor and sides of the box are unitary, the box is closed by a graphite lid, and the heating elements are bars of graphite material fixed in electrically insulating seatings in the box; and the unitary floor and sides of the box are formed by machining a hollow of desired depth in a block of graphite leaving the required thickness of floor.

DESCRIPTION OF THE PREFERRED EMBODIMENT

Figure 1:
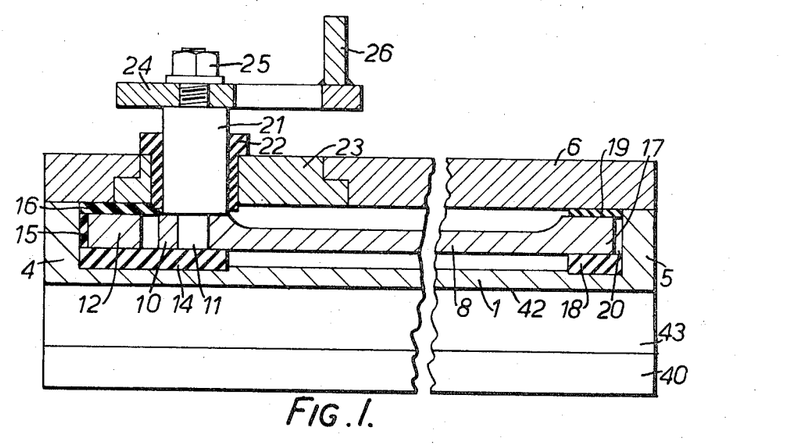
FIG. 1 is a vertical longitudinal section through an electrical heater according to the invention on line I—I of FIG. 2.
Figure 2:
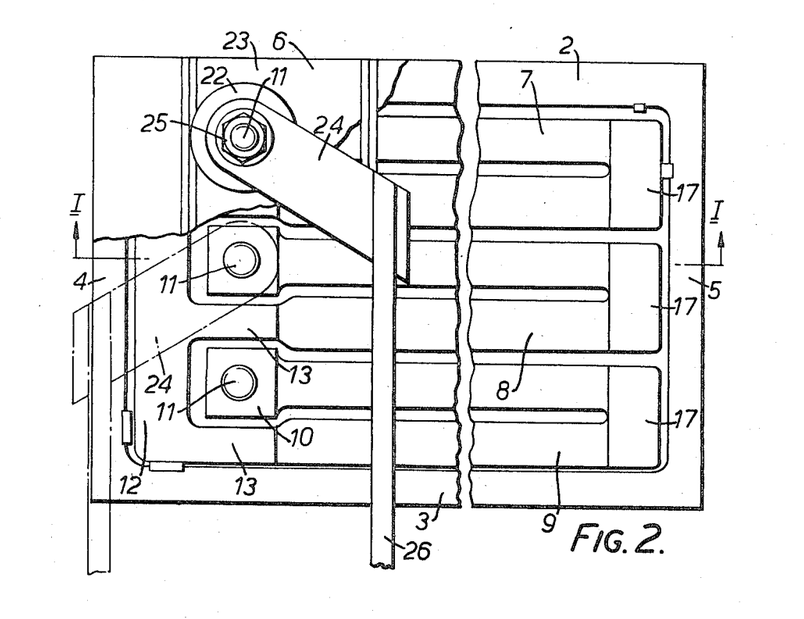
FIG. 2 is a plan view of the heater of FIG. 1 partly boken away to show heating elements.

Referring first to FIGS. 1 and 2 of the drawings an electrical heater for use in float glass manufacturing apparatus comprises carbon heating elements which are mounted in a sealed carbon box. The sealed carbon box has a lower part machined out of a block of general commercial grade graphite material. The block is machined to form a floor 1, longer side walls 2 and 3 and shorter side walls 4 and 5 which are effectively the end walls of the box. The overall dimensions of the box illustrated may for example be 1 m. x 0.35 m. By forming the lower part of the box in this way the floor and the sides of the box are unitary. The box is closed by a lid 6 made of the same graphite material which is sealed to the upper edge of the walls 2, 3, 4 and 5 using an appropriate grade of carbon cement. Carbon heating elements are fixed in insulating supports in the elongated sealed carbon box and in the embodiment of FIGS. 1 and 2 the heater is for connection to a three-phase supply and the heating elements comprise three parallel graphite bars 7, 8 and 9. These bars are machined from a monolithic graphite slab and each of the bars is machined in a U-shaped formation having a thickened end 10 in which is fixed a molybdenum terminal 11. Each bar extends from its thickened end which is located near to one end of the heater, along the length of the heater, and then back to the first end of the heater where the bars join together in a unitary bridging piece 12 which provides the common connection for the three-phase system. Where the bars join into the bridging piece 12, they are formed with narrowing connection parts 13 which are so shaped as to provide accommodation for the thickened ends 10 at the other ends of the bars. The graphite bars 7, 8 and 9 may have a vapour-deposited coating of silicon carbide or carbon in order to prolong their working life.

At the end of the sealed box beneath the thickened ends 10 of the bars and their common bridging connection 12, the shaped graphite slab is seated on an electrically insulating seating block 14 of silicon nitride which is itself seated into a recess cut down into the floor 1 of the box. Further electrically insulating members 15 and 16 are provided to ensure firm location of that end of the graphite slab in the box when the lid is sealed in position. At the other end of the heater, that is the right hand end of the box as shown in the figure, each of the bars is shaped with a thickened portion as it turns back on itself at that end of the heater. The thickened portions are indicated at 17 and are seated on an electrically insulating block 18 of silicon nitride which is also bedded into a recess cut in the floor of the box. A further silicon nitride insulating member 19 is placed on top of the thickened parts 17 of the bars to hold the bars firmly in the box. A gap 20 is allowed between the end faces of the bars and the inner face of the end wall 5 of the box to allow for expansion of the graphite bars 7, 8 and 9 when heating current is supplied.

In this embodiment each of the bars is of rectangular cross-section and of cross-sectional dimension 25 mm. x 10 mm. for example. A grade of graphite used for the slab from which the heating bars are machined has for example a total ash content of less than about 0.5% by weight. A grade having a total ash content of about 0.2% by weight is suitable, and a high purity grade of graphite having a total ash content less than 0.05% by weight has been used.

The resistance of the heating elements depends on their configuration. In the embodiment described the resistivity of the bars 7, 8 and 9 was approximately 8 micro-ohm/centimeter.

The bars may have a vapour-deposited coating of silicon carbide or carbon to prolong their working life.

Figure 4:
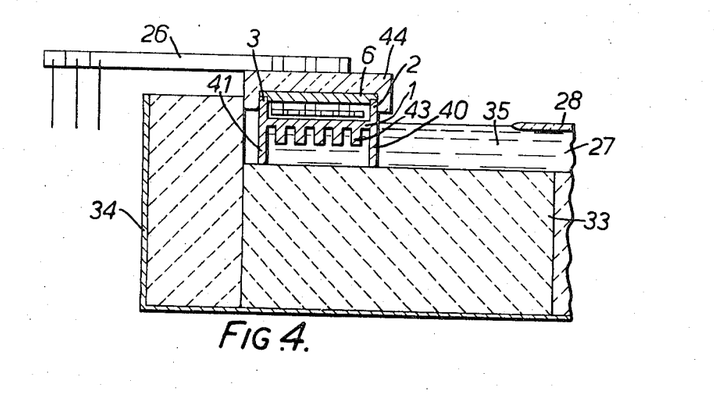
FIG. 4 is a section on line IV—IV of FIG. 3.

The molybdenum terminal 11 fixed into each of the thickened ends 10 of the bars 7, 8 and 9 is a stub projecting from the bottom of a wider diameter molybdenum connector 21 which extends up through the lid 6. The connector 21 is sealed in an electrically insulating bush 22 of silicon nitride or other suitable material, e.g. sillimanite refractory, which is itself mounted in an inset carbon bar 23 which is keyed into a slot formed in the lid 6. The upper end of the connector 21 stands proud of the top of the insulating bush 22 and is formed at its upper end with a narrow diameter threaded stud to which a heat resisting stainless steel electrical terminal strap 24 is secured by a stainless steel nut 25. One of the straps 24 is illustrated in FIG. 2 and a terminal bar 26, also of heat resisting stainless steel, is welded to the upper surface of the strap 24 and provides the means for making electrical connection to the molybdenum connector 21. As indicated in FIG. 2 each bar 7, 8 and 9 has its own electrical connection and the three steel connector bars 26 are also indicated in FIG. 4 extending outwardly through the side wall of a tank structure and serving to locate the heater in position as well as to provide electrical connection. The preferred metal for the terminals 11 and connectors 12 is molybdenum, but they may be made of tungsten.

Figure 3:
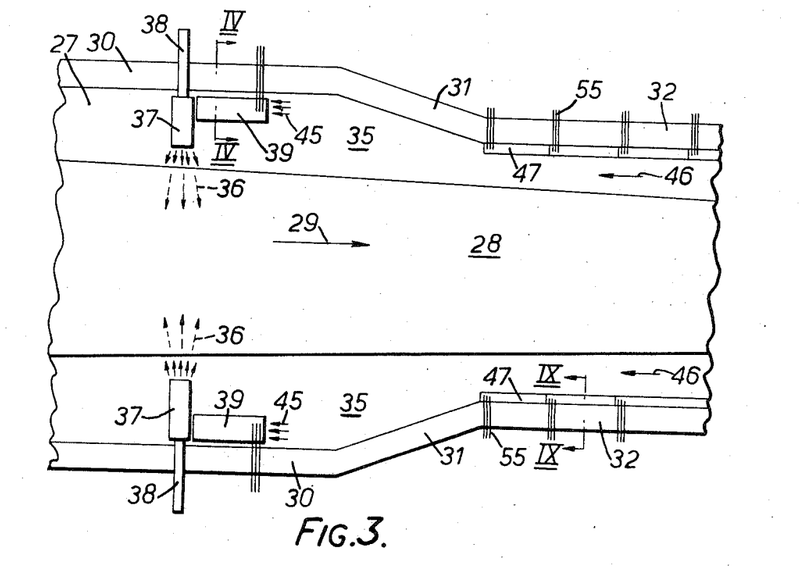
FIG. 3 is a plan view of part of a tank structure containing a bath of molten metal in float glass manufacturing apparatus showing a ribbon of glass advancing along the bath and two of the heaters of FIGS. 1 and 2 positioned near to the side walls of the tank structure, one on either side of the ribbon of glass.

The particular heater of FIGS. 1 and 2 is for positioning in a molten metal bath along which a ribbon of glass is advanced in the float glass manufacturing process. FIGS. 3 and 4 illustrate two of the heaters 1 and 2 in position in such a bath. FIG. 3 shows part of an elongated tank structure containing a bath of molten tin 27 along which a ribbon of glass 28 is being advanced in the manner well known in the float process. In this particular application the ribbon of glass is being gradually attenuated in width and thickness as it is advanced which attenuation is indicated by the gradual narrowing of the ribbon which is advancing in the direction of the arrow 29. The side walls 30 of the tank structure have a convergent section 31 where the width of the bath narrows and thereafter parallel sections which extend right up to the outlet end of the tank structure which is not shown. The side walls 30 extend upwardly from a floor 33 of the tank structure which is encased in a steel casing 34. The tank structure as illustrated is wider than the ribbon of glass, leaving an exposed lane 35 of the molten metal of the bath at either side of the ribbon. In the region of the bath where, as illustrated, the ribbon of glass is being attenuated, the glass is maintained during its traverse of this zone of the bath at a temperature which is so regulated that the glass is at a viscosity at which it can be attenuated, and transverse flows of molten metal 36 are induced in that zone of the bath by means of linear induction motors 37 which are mounted above the molten metal surface, which are cooled, and which are encased in a refractory block in order to ensure that the motors operate at a temperature below the Curie point of the magnetic material of the stators of the motors.

The linear motors 37 which are mounted above the surface of the molten metal bath on the support beams 38 which also extend through the side walls of the tank structure and carry services of electrical supply and cooling water.

The purpose of the transverse flows 36 is to create thermal homogeneity in the bath surface supporting the glass as it is being attenuated thereby considerably reducing the possibility of distortion being introduced into the glass. As the ribbon of glass is advanced in the direction 29 down the bath there is a surface flow of hot molten metal down the surface of the bath toward the outlet end of the bath which results in a tendency to upstream flows of cooler molten metal from the outlet end of the bath towards the hotter regions and such flows can for example take place up the region of the lanes 35 of molten metal exposed alongside the ribbon of glass.

In order to heat these flows prior to the induction of the transverse flows 26, a pair of electrical heaters of the kind illustrated in FIGS. 1 and 2 are positioned in the lanes of molten metal at opposite sides of the tank structure just downstream of the linear motors 37. The heaters indicated at 39 are positioned with their longer side walls 2 and 3 parallel to the tank side walls 30. The longer side walls 2 and 3 of the box are extended downwardly as indicated at 40 and 41 to constitute tunnel walls which are seated on the tank floor 33. The undersurface 42 of the floor 1 of the carbon box of each heater is formed with a series of heat conducting fins 43 which extend downwardly from the floor 1 and are parallel to the tunnel walls 40 and 41. As can be seen from the diagrammatic illustration of the heater in FIG. 4 the tunnel walls 40 and 41 and the fins 43 are also machined from the block of graphite material in which the heating elements are mounted. Alternatively these elements may be made separately and then secured to the floor of the box.

A thermal insulation cover 44 of refractory material is mounted over the lid 6 of the box as shown in FIG. 4. In operation, with the linear motors 37 inducing the transverse flows 36 towards the centre of the molten metal bath, cooler molten metal from the downstream region of the lanes 35 is drawn through the tunnels beneath the heaters as indicated by the arrows 45 and during its passage through the tunnels the molten metal is heated to a required temperature prior to being caused to flow beneath the ribbon of glass which is being attenuated, thereby assisting the maintenance of thermal homogeneity in the ribbon.

Suitable control of the electric current three-phase supply to the graphite bars of the heater would ensure for example that each bar is at about 1,150° C. so that the temperature at the inner surface of the floor 1 of the box would be about 1,050° C. About 75% of the heat generated in the bars is usefully dissipated through the floor of the box and the fins 43 thereby ensure the desired heating of the cooler flows of molten metal 45 prior to their being discharged beneath the ribbon. The heater may, for example, operate at about 60 kw. with a line voltage of approximately 60 volts and a current of approximately 600 amps.

In this application of heaters according to the invention it will be apparent that the heaters are operating under extremely arduous conditions. The temperature in this region may be for example 850° C., being the general temperature of the environment within the tank structure in the zone where attenuation is taking place. The temperature of the molten metal of the bath is of the same order as that in the headspace over the bath and of the glass itself which is being attenuated. Because the heating elements, which are at a much higher temperature, for example up to 1,400° C., are sealed within a graphite box, there is a much lower rate of attack of the graphite constituting the heating bars by the atmosphere in which they are mounted. The box itself is not gas tight having for example a 20% porosity so that there is a reasonable exchange of atmosphere through the walls of the sealed box with the reducing atmosphere in the headspace over the bath and the atmosphere in the box can be thought of as being continually purged through the porous box.

If desired exchange of atmosphere between the interior of the box and the headspace over the bath may be reduced by coating the outer surface of the box which is exposed to the atmosphere, with a spray-coated layer, e.g. of aluminium oxide, after the box has been sealed with the bars in position within the box. A spray-coated layer, e.g. of aluminium oxide, may also be formed over the upper surface of the lid as well as the outer surfaces of the side and end walls of the box. The undersurface of the floor and the surfaces of the fins are left uncoated. Leaving the bottom surface of the box black in this way makes for better heat transfer whether with the molten metal in the arrangement as illustrated, or by radiation towards the molten metal or glass if the heater is positioned above the molten metal surface.

A separate purging gas supply may be provided through a gas supply inlet to the box, the purging gas preferably comprising a mixture of an inert gas, nitrogen or argon, with a reducing gas, hydrogen, in a higher proportion than that of reducing gas in the protective atmosphere over the bath. The purging gas escapes through the porous box walls when uncoated. When the box walls are coated a separate gas outlet is provided. An inert gas alone may be used as the purging gas.

The heaters are not necessarily disposed parallel to the side walls of tank structure, and may be disposed at an angle to the direction of advance of the ribbon, e.g. 45°. In another embodiment the heaters may be disposed at right angles to the direction of advance of the ribbon with the fins extending across the shorter width dimension of the heater floor in applications where a less intense heating of the metal flow is desired.

Figure 8:
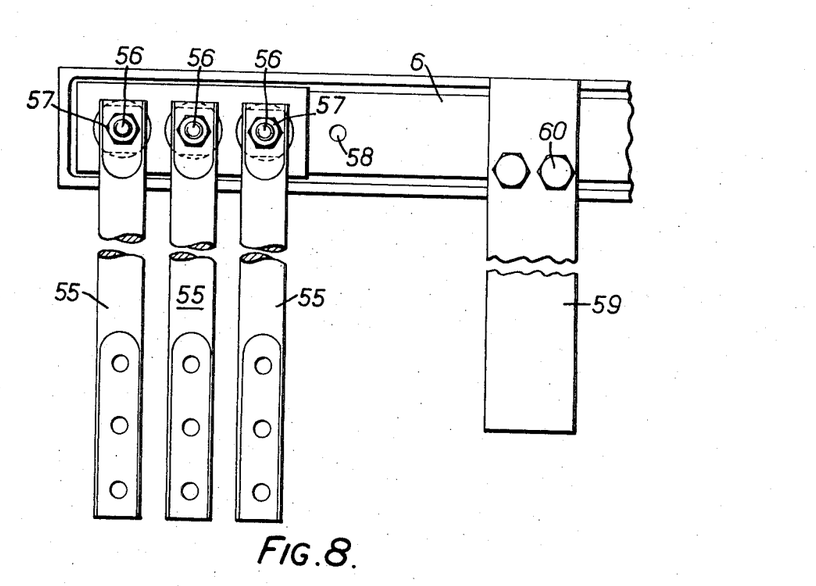
FIG. 8 is a plan view of the heater of FIG. 5 with the lid in position and showing the manner of making electrical connection to the heater.
Figure 9:
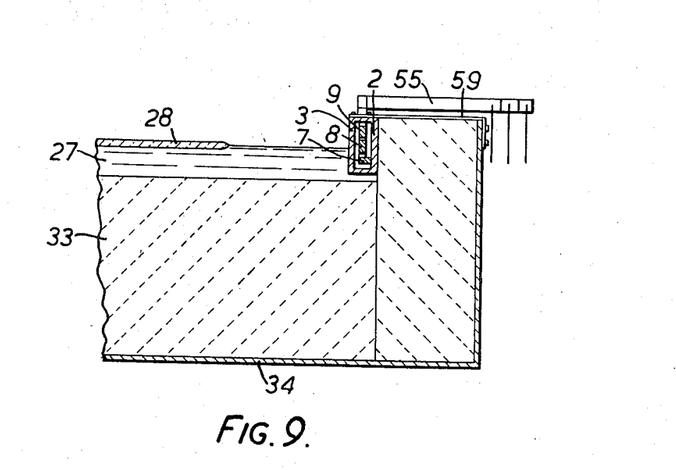
FIG. 9 is a section on line IX—IX of FIG. 3 illustrating in more detail the disposition of a side wall heater dipping into the molten metal bath alongside the ribbon of glass.

Referring again to FIG. 3 additional advantage is achieved if the flows of molten metal from the outlet end of the tank structure towards the heaters 39 shall themselves be preheated. Such flows of cooler molten metal upstream of the lanes 35 are indicated by the arrows 46 and to effect preliminary heating of these flows of molten metal which are drawn upstream along the lanes 35, electrical heaters according to the invention may be mounted on each of the side wall parts 32 of the tank structure. Such side wall heaters are indicated generally at 47 in FIG. 3 and the construction of one of those side wall heaters is illustrated in detail in FIGS. 5 to 8. FIG. 9 shows generally how one such heater is supported on the side wall part 32 of the tank wall structure.

Figures 5, 6:
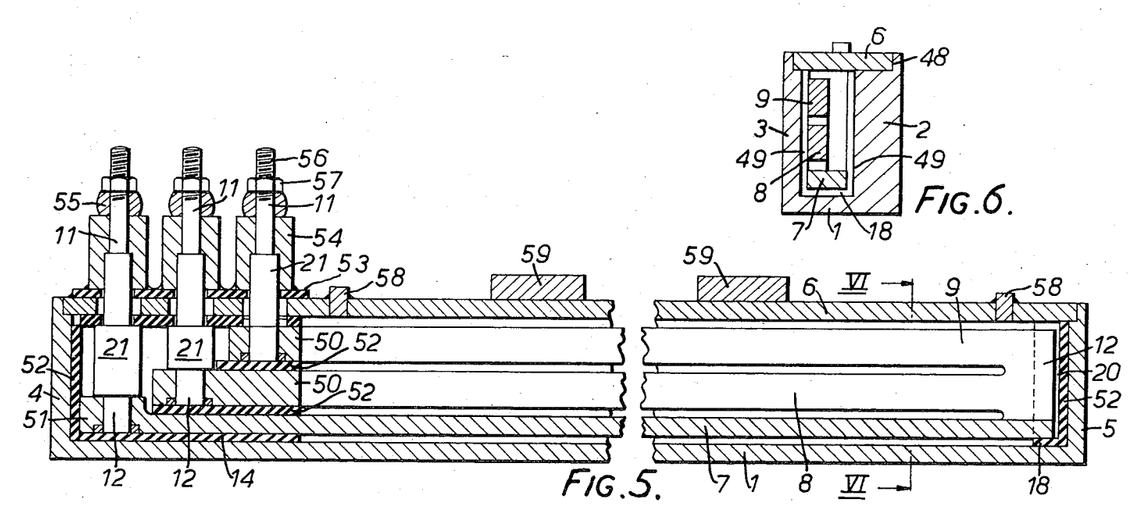
FIG. 5 is a vertical longitudinal section similar to FIG. 1 through a side wall heater according to the invention for positioning along the side walls of the tank structure in the manner indicated at the right-hand end of FIG. 3.
FIG. 6 is a section on line VI—VI of FIG. 5.
Figure 7:
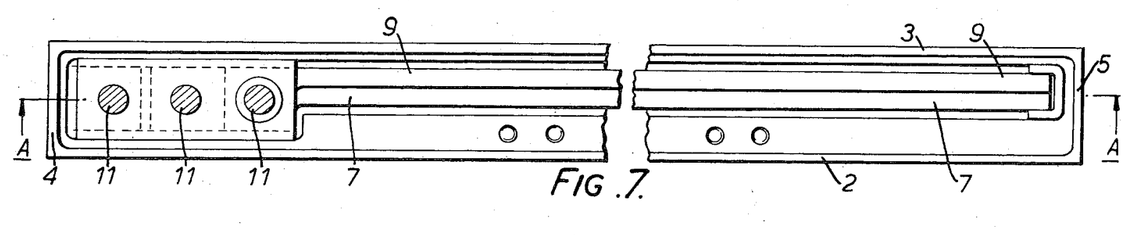
FIG. 7 is a plan view of the heater of FIGS. 5 and 6 with the lid removed from the sealed box of the heater showing the disposition of the graphite heating bars.

Referring to FIGS. 5 to 8 the carbon box in which the graphite heating elements are mounted is of rectangular cross-section with its floor 1 and lid 6 shorter than the upright sides 2 and 3. The floor does not have any fins or downward extensions as in the embodiment of FIGS. 1 and 2 and the lid 6 is simply sealed, using carbon cement, into rebates 48 cut into the upper ends of the upright sides 2 and 3 of the box. The graphite bars are single bars 7, 8 and 9 of elongated rectangular cross-section mounted one above the other in the box. The lowermost bar 7 is mounted in electrically insulating seatings 14 and 18 on the floor of the box with a longer side of its cross-section parallel to the floor. This is best illustrated in FIG. 6. The other two bars 8 and 9 are mounted in line above the lowermost bar with their longer sides upright and a shorter side of the bar 7 and a longer side of each of the bars 8 and 9 abut against a common insulating silicon nitride or other suitable refractory e.g. fused silica, support lining 49 for the carbon box.

At one end the three bars 7, 8 and 9 are joined by an integral vertical bridging piece 12 and at their other ends each of the bars 8 and 9 is formed with a widened part 50. The widened end 50 of the bar 9 is shorter than the widened end 50 of the bar 8 and the lowermost bar 7 extends beneath these widened parts and terminates in its own thickened and widened terminal part 51. Insulating blocks of silicon nitride or other suitable refractory, e.g. fused silica, are located between the terminal parts 50 of the bars 8 and 9 and between the terminal parts 50 of the bar 8 and the bar 7. The end 51 of the bar 7 is insulated from the end wall of the box by a silicon nitride liner 52. A similar silicon nitride liner 52 is mounted as a facing on the other end wall of the box and an expansion gap 20 exists between the bridging end 12 of the heating elements and the liner 52. A molybdenum connector 21 is fixed to each of the free ends of the bars in similar manner to that described with reference to FIGS. 1 and 2 and the molybdenum connectors extend upwardly through insulating bushings 53 fixed into the lid 6 and through insulating sleeves 54 which are cemented to the bushings 53.

The upper ends of the molybdenum connectors are formed as threaded stubs and connection straps 55 of heat resisting stainless steel are secured to the upper ends 56 of the connectors by nuts 57. The steel connection straps 55 extend outwardly through the tank side wall as indicated in FIG. 8 and as shown diagrammatically in FIG. 9.

Graphite plugs 58 are cemented in holes in the lid and may be removed for purging the space inside the box if necessary. Heat resisting steel straps 59 are secured by bolts 60 to the lid and these straps are secured to the tank side wall in the manner indicated in FIG. 9 in order to hold the side wall heater in location against the side wall of the tank structure. FIG. 9 illustrates one way of securing the straps 59 which are bent downwardly outside the tank structure and bolted to the outer steel shell of the tank structure. Part at least of the outer surface of the box of the side wall heaters may be coated with an impermeable layer of silicon carbide or pyrolitic graphite if required.

If desired the heaters may be fitted into recesses formed in the side wall blocks of the tank structure.

A series of such side wall heaters may be provided as in effect a lining for the narrower part of the side walls of the tank structure thereby ensuring the preliminary heating of the relatively cooler flow of molten metal which are taking place up the side lanes alongside the ribbon of glass. In this way the molten metal presented to the heaters 39 is already nearer to the required temperature of the metal supporting the glass being attenuated and a lower level of heating as the metal flows through the tunnel beneath each of the heaters 39 is required.

The connection straps 55 are connected to a three-phase electrical supply in the same manner as the connection bars 26 which three-phase supply can be regulated to regulate the temperature of that part of the box of the side wall heaters in contact with the molten metal. The side wall heater may, for example, operate at about 30 kw. with a line-voltage of approximately 30 volts and a current of approximately 600 amps.

Figure 10:
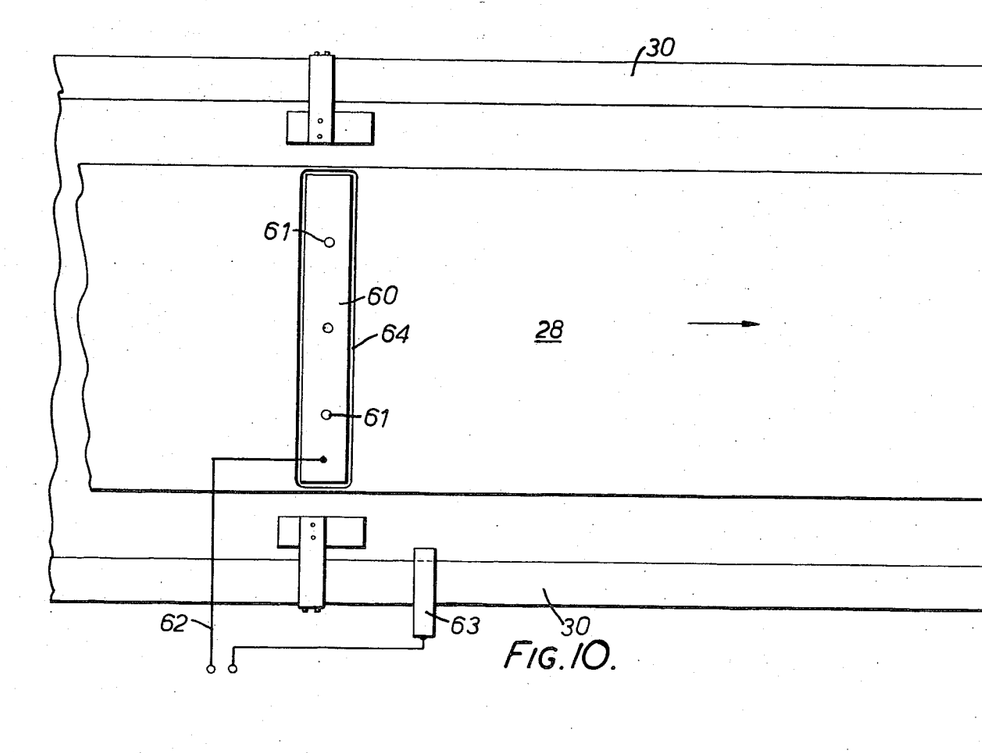
FIG. 10 illustrates another embodiment of the invention in which a pair of heaters of the kind illustrated in FIGS. 1 and 2 are employed for assisting maintenance of thermal uniformity across the width of the ribbon of glass in a process in which the upper surface of the ribbon is being modified.

Another application of the invention is illustrated in FIG. 10. The ribbon of glass 28 advancing along the bath of molten metal which is contained in a tank structure including parallel side walls 30, is being subjected to a surface modification by a method in which a body of molten material for modifying the upper surface of the ribbon of float glass is located in contact with the upper surface of the ribbon by clinging to an elongated locating bar which extends transversely of the ribbon of glass just above the path of travel of the upper surface of the ribbon. For example the elongated locating bar 60 of rectangular shape may be a copper electrode which is suspended from the roof structure by insulating hangers 61. The copper bar 60 is electrically connected to a supply which can be regulated and the electrical connection illustrated at 62 is such that the bar 59 acts as an anode. An electrode 63 is immersed in the molten metal bath alongside the path of travel of the ribbon of glass and is connected to the other terminal of the supply. It is customary that the electrode 63 is earthed. The body of molten material 64 which clings to the undersurface of the bar 60 and is thereby located in contact with the upper surface of the ribbon of glass 28 advancing along the bath may for example be a body of molten copper/lead alloy and the passage of electric current from that body into and through the glass when the electrical supply is connected results in migration of copper and lead ions from the molten body 64 into the upper surface of the ribbon which ions are subsequently reduced as the glass passes from beneath the molten body 64 and is exposed to the reducing atmosphere in the headspace over the bath.

Among other factors which control the intensity of treatment of the ribbon to produce a heat rejecting glass having a bronze appearance are the temperature of the glass as it is undergoing treatment, and uniformity of treatment across the width of the ribbon is dependent on maintaining as nearly as possible uniformity of thermal conditions across the whole width of the ribbon of glass. In order to assist maintenance of thermal uniformity across the ribbon as its surface is modified a pair of heaters 39 of the kind illustrated in FIGS. 1 and 2 may be located in the molten metal alongside the path of travel of the ribbon of glass at either end of the elongated locating member. The existence of these heaters, which can be individually regulated, helps to ensure that any thermal gradient existing across the ribbon in the zone of treatment is at a minimum.

Figure 11:
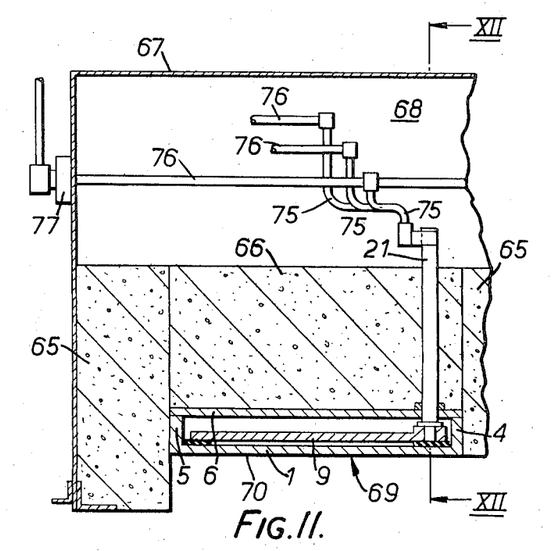
FIG. 11 is a cross-section through part of a roof structure over a molten metal bath in float glass manufacturing apparatus showing an electrical heater according to the invention embodied in the roof structure.
Figure 12:
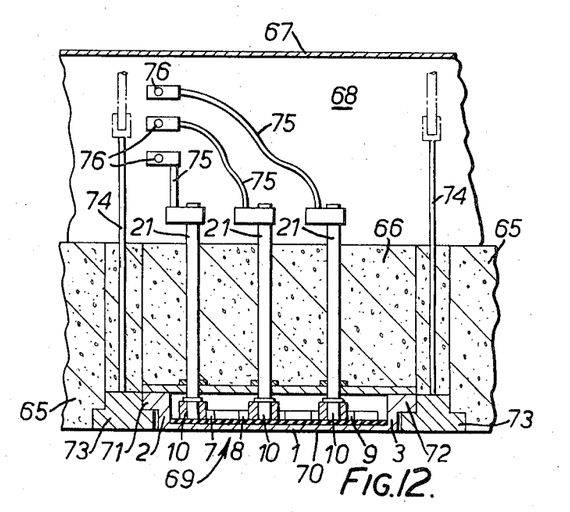
FIG. 12 is a part section on line XII—XII of FIG. 11.

Electric heaters according to the invention may also be mounted in the roof structure over a bath of molten metal in the float apparatus, to radiate downwardly on to the ribbon of glass and on to the molten metal, as illustrated in FIGS. 11 and 12.

The roof structure comprises refractory blocks 65 and 66 which are mounted in a steel casing 67 which is the outer casing of the roof. A space 68 is provided above the refractory blocks and within the casing to house electrical connections to an electric heater according to the invention which is embodied in the roof structure. The heater is indicated generally at 69 and is a modified form of the heater of FIGS. 1 and 2 without the downward side wall extensions 40 and 41 and without the fins 43. The undersurface 70 of the floor 1 of the carbon box is flat and is co-planar with the undersurface of the refractory blocks 65 which bridge the tank structure.

The undersurface 70 of the floor is untreated to provide a highly emissive surface. Heavy protective coatings of silicon carbide, pyrolitic graphite or sprayed refractory oxide, e.g. aluminium oxide, are provided on the outer surface of the lid and the side and end walls of the carbon box.

FIG. 12 shows that the side walls 2 and 3 of the carbon box are formed with flanges 71 and 72 which rest on shoulders formed on keys 73 which fit into rebates in the lower corners of the refractory blocks 65 and 66 and are suspended by hangers 74 from the roof casing.

The refractory block 66 has the same outer dimensions as the carbon box of the heater and can be removed bodily with the heater element 7, 8, 9 and the lid 6 to permit the heater to be serviced, for example to renew the heater element, without removal of the carbon box, which remains in position resting on the shoulders on the keys 73. This avoids any substantial breaking of the seal of the headspace over the bath.

Long molybdenum connectors 21 extend through the block 66 and are connected by flexible braids 75 to standard three-phase bus bar connectors 76, one of which is shown in FIG. 11 extending through insulators 77 in the roof casing 67.

One such heater may, for example, operate at about 35 kw. with a line voltage of 34 volts and a current of 600 amps. The undersurface 70 radiates downwardly from the roof on to the molten metal bath and the glass advancing along the bath.

Figure 13:
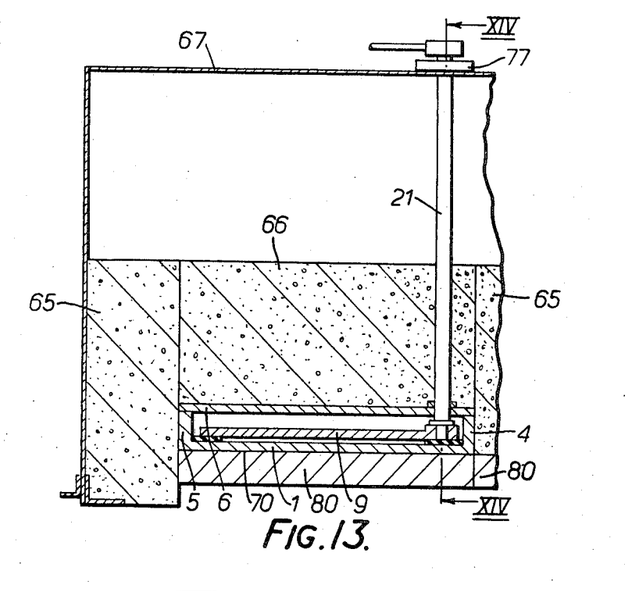
FIG. 13 is a view similar to FIG. 11 of another embodiment of roof heater according to the invention.
Figure 14:
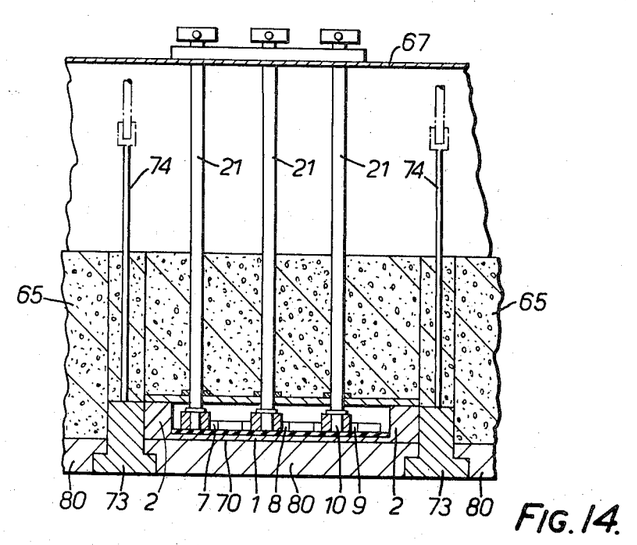
FIG. 14 is a part section on line XIV—XIV of FIG. 13.
In the drawings the same references indicate the same or similar parts.

In the embodiment illustrated in FIGS. 13 and 14, the roof structure has a lining of plates 80 of high thermal conductivity graphite which are held in position by the keys 73. The flat underface 70 of the floor of the heater contacts the upper face of one of the plates 80 so that the plate 80 is heated and radiates downwardly. The removal of the refractory block 66 with the entire heater including its carbon box can be achieved without breaking the seal of the headspace over the bath which is maintained by the roof lining plates 80.

I claim:

1. An electrical heater in combination with apparatus for the manufacture of flat gas on a molten metal bath, said heater comprising carbon electrical heating elements fixed in insulating supports in an elongated carbon box, and electrical connectors extending through and into the box.

2. The combination according to claim 1, wherein the carbon box is sealed.

3. The combination according to claim 1, wherein the floor and sides of the box are unitary, a graphite lid closes the box, and the heating elements are bars of grahpite material fixed in electrically insulating seatings in the box.

4. The combination according to claim 3, wherein the electrical connectors are terminals of a refractory metal which is non-reactive to carbon, fixed to the graphite bars and each held into the lid of the box.

5. The combination according to claim 4, wherein the terminals are made of molybdenum.

6. The combination according to claim 4, wherein for connection to a three-phase supply, the heating elements comprise three parallel graphite bars which are joined together at one end, and molybdenum connectors are respectively fixed to the other ends of the bars.

7. The combination according to claim 6, wherein the graphite bars are machined from a monolithic graphite slab which is seated in electrically insulating seatings on the floor of the box.

8. The combination according to claim 1, for positioning in a molten metal bath contained in a tank structure, along which bath a ribbon of glass is advanced in the float glass manufacturing process, wherein the box has longer side walls including downward extensions for seating on the floor of the tank structure, and the undersurface of the floor of the box is formed with a series of fins extending parallel with the side walls to facilitate heat exchanger with molten metal of the bath flowing beneath the box.

9. The combination according to claim 8, wherein the longer side walls of the box are extended downwardly to constitute tunnel walls for seating on the tank floor.

10. The combination according to claim 3, for positioning along the side walls of a tank structure containing a bath of molten metal along which a ribbon of glass is advanced in the float glass manufacturing process, wherein the carbon box is of rectangular cross-section with its floor and lid shorter than the upright sides, and the graphite bars are of elongated rectangular cross-section mounted one above the other in the box.

11. The combination according to claim 10, wherein the lowermost bar is mounted in an electrically insulating seating on the floor of the box with a longer side of its cross-section parallel to the floor, and the other two bars are mounted in line above said lowermost bar with their longer cross-sectional sides upright.

12. In float glass manufacturing apparatus comprising an elongated tank structure including elongated side walls and containing a bath of molten metal along which a ribbon of float glass is advanced, the tank structure being wider than the ribbon of glass leaving an exposed lane of molten metal at either side of the ribbon, a pair of electrical heaters respectively positioned in said lanes of molten metal at opposite sides of the tank structure, each heater comprising an elongated carbon box, carbon electrical heating elements fixed in insulating supports in said box, electrical connectors extending through and into the box and connected to said heating elements, and a series of fins formed integrally with the undersurface of the floor of the box which fins extend parallel to said side walls of the tank structure to facilitate heat exchange with molten metal of the bath flowing beneath the box.

13. Apparatus according to claim 12, wherein each said heater is positioned with longer side walls of the elongated carbon box parallel to the tank side walls, and a linear induction motor is mounted in the tank structure just upstream of each heater and above the exposed molten metal surface, each said linear induction motor being directed to operate inwardly towards the path of travel of the glass ribbon to draw molten metal flows in an upstream direction along said lanes beneath the heaters and then to direct those flows of heated molten metal into the central ribbon-supporting region of the bath.

14. Apparatus according to claim 13, further including in each said lane at least one additional said electrical heater mounted on each side wall of the tank downstream of the first mentioned heater in that lane to heat the flow of molten metal drawn upstream along that lane.

15. Apparatus according to claim 11, wherein the heaters are positioned in the tank structure at either end of an elongated locating member mounted in the tank structure across the path of travel of the ribbon of glass to locate on the ribbon surface a molten body of a material for modifying the upper surface of the ribbon, the heaters being effective to assist maintenance of thermal uniformity across the ribbon as its surface is modified.

16. An electrical heater according to claim 1, embodied in a roof structure located over a tank structure containing a molten metal bath in float glass manufacturing apparatus, the carbon box being fixed in the roof structure with the undersurface of the floor of the box directed towards the molten metal bath.

17. A float glass manufacturing method comprising advancing the ribbon of glass along a molten metal bath, attenuating the glass while traversing a zone of the bath where the glass is at a viscosity at which it can be attenuated, and inducing transverse flows of molten metal in that zone of the bath to create thermal homogeneity in the bath surface supporting the glass, by drawing molten metal flows to supply said transverse flows up the sides of the bath beneath immersed heaters which raise the temperature of the molten metal to a temperature of the order of the temperature of said zone of the bath, said heater comprising carbon electrical heating elements fixed in insulating supports in an elongated carbon box, and electrical connectors extending through and into the box.

References Cited
UNITED STATES PATENTS

| | | | |
|---|---|---|---|
| 3,492,107 | 1/1970 | Simpson et al. | 65—182 R |
| 3,333,936 | 8/1967 | Warren | 65—182 R |
| 3,607,199 | 9/1971 | Itakura et al. | 65—182 R |
| 3,607,203 | 9/1971 | Fujimoto et al. | 65—182 R |
| 3,479,171 | 11/1969 | Robinson et al. | 65—182 R |

ROBERT L. LINDSAY, Jr., Primary Examiner

K. M. SCHOR, Assistant Examiner

U.S. Cl. X.R.
13—22; 65—182 R